358-69. OR 2,960,564 SR

SEARCH ROOM

T G532
X G533

Nov. 15, 1960 J. K. OXENHAM 2,960,564

INDEXING IN COLOR TELEVISION RECEIVERS

Filed Feb. 14, 1957

INVENTOR
JOHN KENNETH OXENHAM
BY
J. Albert Hultquist
ATTORNEY

United States Patent Office 2,960,564

Patented Nov. 15, 1960

2,960,564

INDEXING IN COLOR TELEVISION RECEIVERS

John Kenneth Oxenham, London, England, assignor to Sylvania-Thorn Colour Television Laboratories Limited, London, England Filed Feb. 14, 1957, Ser. No. 640,291

6 Claims. (Cl. 178—5.4)

The present invention relates to indexing in color television receivers.

The invention is concerned with receivers for use with signals of the kind in which the brightness of each of the three primary colors in a picture element is represented by three independent potentials in time sequence. The received signals need not, of course, be of this kind, so long as they can be converted to the kind specified. The receiving screen is arranged to emit or transmit light of the appropriate colors successively at the instants when a beam scanning the screen is modulated in accordance with the corresponding color signal components. Indexing is required in order to ensure that the movements of the scanning beam over the color elements of the screen are maintained in correct phase relation to the modulating signals applied to the scanning beam.

In one form of receiver the screen of a cathode ray tube is provided with parallel stripes in repeating groups of three stripes, the stripes in each group emitting blue, green and red light respectively when bombarded by the cathode ray beam which is arranged to sweep over the stripes in a direction perpendicular to their length.

One indexing system for use in such a receiver makes use of secondary electron emission. One selected stripe in each group, say the green-emitting stripe, is given a different coefficient of secondary emission from the other stripes of the group or is associated with a stripe of material having a different coefficient of secondary emission, with the result that each time the cathode ray beam sweeps over one of these selected stripes a pulse of current is generated both in a conducting coating of the screen and also in a secondary electron collecting electrode. Either of these pulses can be used for indexing purposes.

Another indexing system makes use of a photo-electric cell arranged to receive light from the stripes and rendered selectively responsive to light of one color such as blue, for example by means of a suitable light filter. The pulses generated in the photo-electric cell when the beam sweeps over the selected stripes are used for indexing. However, it will be shown that when picture signals are applied to the screen, errors in indexing will be caused.

In one known color television system, described for instance in the specification of United States Patent No. 2,667,534, the signal voltage V applied to the control grid of the cathode ray tube has the form $$V=V_0+V_1\cos(\omega_1 t+\phi)+V_c\cos\omega_c t\ \ldots \quad (1)$$

where $V_0$ is the luminance signal and represents the brightness of the picture, $V_1$ depends upon the color saturation, $\theta=\phi_1+\phi$, where $\phi$ represents the hue of the color and $\phi_1$ the phase of the index signal, $\omega_1$ is the angular index frequency, and $\omega_c$ is the angular frequency of a locally generated carrier of amplitude $V_c$.

The current I in the cathode ray tube may be assumed to have the form $$I=g_0+g_1V+g_2V^2+g_3V^3+\ \ldots \quad (2)$$

where $g_0$, $g_1$ etc. are constants.

The indexing operation can be assumed to have the effect of multiplying the current I by some indexing function M which is in the form of rectangular pulses having a recurrence period equal to the time interval between successive indexing pulses, a duration equal to that of an indexing pulse, and an amplitude extending from $M=1$ to $M=n$, $n$ being referred to as the index ratio.

The function M may be expressed as a Fourier series:

$$M=m_0+m_1\cos\omega_1 t+m_2\cos 2\omega_1 t+\ \ldots \quad (3)$$

where $m_0$, $m_1$ etc. are constants.

Assuming that the indexing system employed is that using a photo-electric cell or photo-multiplier, the signal obtained from this cell will be the product of Equations 2 and 3. It can be shown that if the characteristic of the cathode ray tube is linear so that Equation 2 becomes $$I=g_0+g_1V$$

the indexing signal from the photo-multiplier is constant in amplitude and phase, as is required, and is not dependent in any way on the luminance or chrominance signals.

Unfortunately, however, a cathode ray tube has a characteristic which is more nearly a square law characteristic for which Equation 2 takes the form $$I=g_0+g_2V^2$$

Under these conditions it can be shown that the indexing signal from the photo-multiplier varies both in amplitude and phase in dependence upon the luminance and chrominance signals and also in dependence upon $m_0$ and $m_1$. This situation would not be materially improved if no signal at all were obtained when the beam was not on an index stripe, that is to say if the index ratio were made infinite.

Certain ways of overcoming or reducing the effects on indexing of the non-linearity of the cathode ray tube have been proposed. In one of these the cathode ray tube is provided with two grids arranged side by side in the same plane, whereby each grid modulates a different part of the electron beam. The luminance and chrominance signals (that is the first two terms of Equation 1) are applied to one grid and the locally generated carrier (that is the third term of Equation 1) is applied to the other grid. The effect of this is that the signals applied to the two grids, instead of being multiplied together, have an additive effect, and there are no cross-modulation products.

This arrangement, however, introduces difficulties in ensuring that the two beam portions associated with the two grids are accurately conveyed upon a single spot on the screen over the whole length of each scanning line. Any failure in this respect will result in a luminance and chrominance error because the luminance and chrominance beam portion will be modulated in accordance with the position of the index beam portion and not in accordance with the position of the luminance and chrominance beam portion.

Another known means of overcoming or reducing the difficulties introduced by non-linearity is to select from the output of the photo-multiplier the frequency $2\omega_c+\omega_1$, that is the second harmonic of the carrier with the index frequency sideband.

A further difficulty however arises with all the known arrangements referred to. It has been assumed hitherto that the phase angle $\phi_1$ that the index signal assumes after passing through an amplifier associated with the photomultiplier is constant. This is true only if $\omega_c$ and $\omega_1$ are constant and in practice $\omega_1$ will fluctuate about a mean value due to variations in the velocity of the scanning spot and due to inaccuracies in the positions of the stripes. The amplifier should, in fact, have a phase-frequency response which represents a constant phase delay for all frequencies which $\omega_c+\omega_1$ can assume. This is in contrast to the usual requirement of the response of an amplifier, namely a constant time delay, that is a linear phase-frequency relationship.

Amplifiers designed to have the characteristic referred to have been proposed but are relatively complicated and expensive.

The present invention has for its principal object to provide an indexing system for a color television receiver in which the difficulties referred to are reduced or avoided and which is relatively simple.

According to the present invention there is provided a color television receiver adapted for use with signals of the kind specified and comprising a cathode ray tube, a loop circuit including the cathode ray beam, a responsive device, an amplifier connected to amplify the output of the responsive device and means for modulating the cathode ray beam in accordance with the output of the amplifier, the screen of the cathode ray tube being provided with a plurality of indexing members adapted to give rise to changes in current in the responsive device when the cathode ray beam passes on to and off each of said indexing members, and the gain of the said loop circuit being such that the circuit changes from an oscillatory to a non-oscillatory state or vice versa when the beam passes on to an indexing member.

Thus whereas known indexing systems have been what may be called "analogue" systems, the system of the present invention may be called a "digital" or "on-off" system and consequently the non-linearity of the cathode ray tube does not affect its operation.

The invention will be described by way of example, with reference to the accompanying drawing in which.

Figures 1, 2, 3, 4:
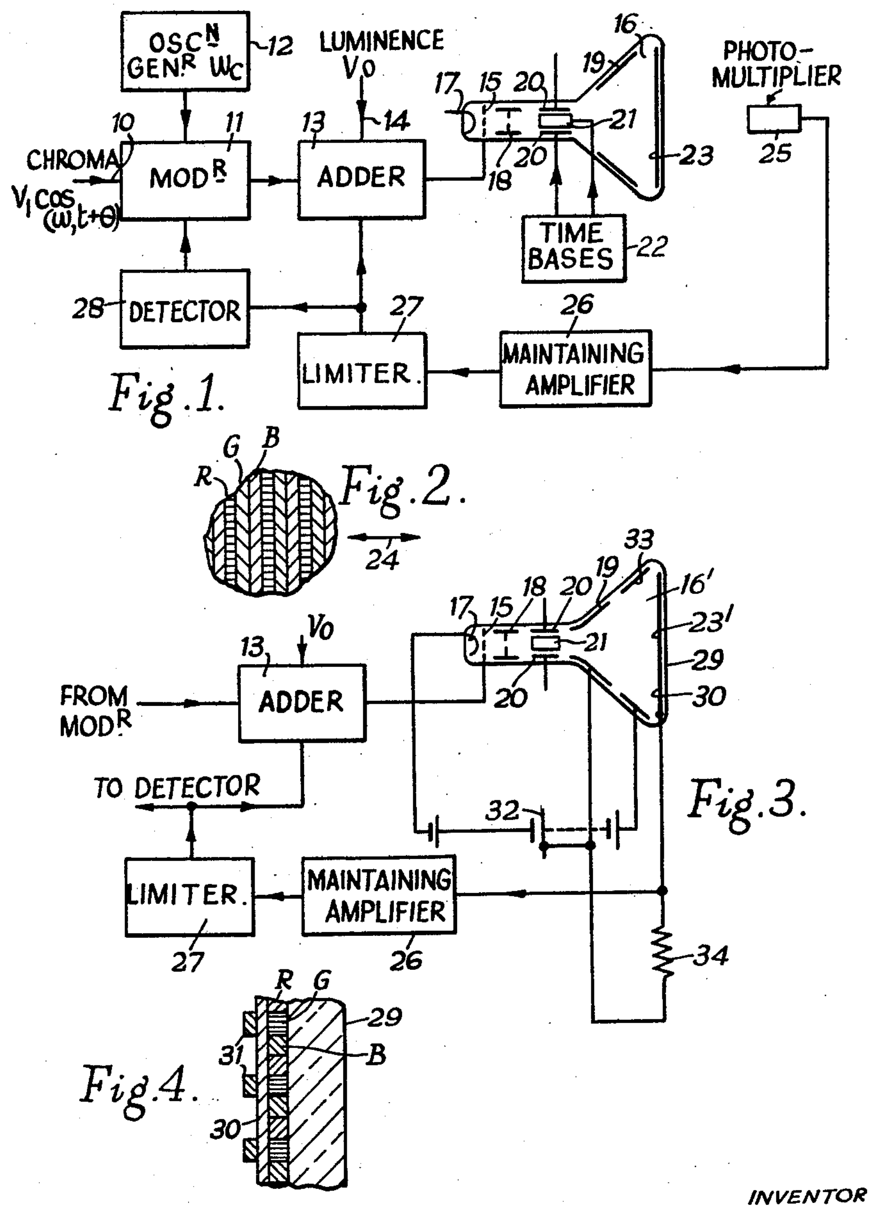
Fig. 1 is a block circuit diagram of one embodiment of the invention.
Fig. 2 is a much enlarged view of a fragment of the screen of the cathode ray tube in Fig. 1.
Fig. 3 is a block circuit diagram of a part of another embodiment of the invention.
Fig. 4 is a sectional plan view, much enlarged, of a part of the screen of the cathode ray tube in Fig. 3.

Referring to Fig. 1, the chrominance signal is fed at 10 to a modulator 11 in which it modulates a locally generated carrier from an oscillation generator 12 and the modulated oscillation is fed to an adder 13 in which it is combined with the luminance signal fed in at 14. The output of the adder is applied to the grid 15 of a cathode ray tube 16, having a cathode 17, focusing means represented by the electrode 18 and final anode 19, and beam deflecting electrodes 20, 21 coupled to time bases 22.

The cathode ray tube has a screen 23 which, as shown in Fig. 2, is provided with repeating groups of stripes R, G and B of materials fluorescing to emit red, green and blue light respectively when bombarded by the cathode ray beam. The stripes are perpendicular to the direction of line scanning represented by the arrow 24.

A photo-multiplier 25 is arranged to be selectively responsive to the scanning of one color on the screen 23 of the cathode ray tube and is coupled through a maintaining amplifier 26 and a limiter 27 to the adder 13. The output of the limiter is also coupled through a detector 28 to the modulator 11.

Thus in this case the responsive device is the photo-multiplier 25 and the loop circuit includes the cathode ray beam, the photo-multiplier 25, the amplifier 26, the limiter 27, the adder 13, and the grid 15 of the cathode ray tube. The gain around the loop is arranged to be greater than unity at zero phase shift when the beam is indexed (i.e. when it impinges on a strip of the selected color on the screen) and less than unity when it is not indexed. The bandwidth of the loop circuit is made sufficient to include the carrier frequency $\omega_c$ and at least one sideband of the index frequency $\omega_1$. The limiter 27 is provided in order to limit the amplitude of the oscillations to some value small enough to avoid a shift in luminance values due to the rectifying action of the cathode ray tube.

In order to explain the properties required of the loop circuit, it will be assumed that the cathode ray tube has a square law characteristic and that the maximum picture contrast ratio required is 100:1. Since the brightness of the tube is very nearly proportional to the current in the tube, it will be assumed that the ratio of tube currents for peak "white" and peak "black" is 100:1.

The tube current $I=KV_g^2$, where K is a constant and $V_g$ is the voltage on the grid 15, and the voltage $V_g$ will therefore vary over a range of 10:1. The mutual conductance $g_m$ of the tube is the differential of the current with respect to grid voltage and is therefore equal to $2KV_g$, so that $g_m$ will also vary over a range of 10:1.

The overall gain of the cathode ray tube 16 and photo-multiplier 25 taken together will be proportional to $ng_m$, where $n$ is, as before, the index ratio, or to $g_m$, depending on whether the beam is indexed or not. It follows that if an index ratio $n$ of greater than 10 can be provided, the minimum value of $ng_m$ will always be greater than the maximum value of $g_m$, and, therefore, whatever value the tube current assumes in its range of 100:1, the gain of the cathode ray tube and multiplier taken together will always be greater when the beam is indexed than when it is not indexed. The gain of the amplifier is then chosen to give a loop gain of greater than unity when the beam is indexed and less than unity when the beam is not indexed. There will then be oscillation of the loop circuit in the first case and no oscillation in the second case.

It has been found possible in practice to obtain an index ratio exceeding 100:1 if great care is taken in the deposition of the phosphors to form the stripes and this figure gives an ample margin of safety.

The invention can also be applied to indexing systems using secondary emission. Such systems do not, at first sight, appear likely to be so satisfactory as the photo-electric system previously described because of their inherently lower index ratio which is usually of the order of 2:1.

However, according to a feature of this invention, an effective index ratio greater than 2:1 can be obtained as will be described by way of example, with reference to Figs. 3 and 4. The components 12, 11 and 28 of Fig. 1 are provided also in Fig. 3 although not shown.

The screen 23' is formed on the inside of the end face 29 of the envelope and of the tube 16', as shown in Fig. 4, and comprises phosphor stripes R, G, B in groups of three different color fluorescence. Over these is provided what will be called a screen electrode 30 in the form of an electron-permeable layer of aluminum, magnesium, or beryllium extending over the whole screen. Over the screen electrode and aligned with the stripes of one color, say the green-emitting phosphor, are index members 31 formed of a material having a high secondary emission coefficient. The material may for example be a mixture containing magnesium oxide.

The tube comprises the usual beam accelerating and focusing electrodes as in Fig. 1 including a final anode 19 maintained at a suitable positive potential relatively to the cathode 17 by means represented in Fig. 3 by a battery 32. The screen electrode 30 is maintained at the final anode potential and a secondary electron collector 33, in the form of a conducting coating on the tube wall between the final anode 19 and the screen 30, is maintained more positive than the screen.

If $\delta$ is the secondary emission coefficient of a point on the screen bombarded by a single electron, then $\delta$ electrons will leave the screen and reach the collector. The currents in the leads from the collector and screen electrode to the voltage source will then be proportional to $\delta$ and $1-\delta$ respectively. If the secondary emission coefficients of the index member and screen electrode are $\delta_1$ and $\delta_2$ respectively, the index ratio at the collector will be $\delta_1/\delta_2$ and that at the screen electrode will be $(1-\delta_1)/(1-\delta_2)$. A lead resistor 34 is therefore connected between the screen electrode 30 and the source of voltage 32, and the voltage across this resistor is amplified in 26 and applied through the limiter 27 to the adder 13. If $\delta_2$ is chosen to have a value nearly equal to unity, and if $\delta_1$ has a higher value, say between 1.5 and 3, a high effective index ratio can be obtained. In this example the resistor 34 constitutes the aforesaid responsive device. Some control of the secondary emission coefficient can be obtained by varying the voltage between the collector 33 and the screen electrode 30 and, if necessary, also the voltage between the final anode 19 and the screen electrode 30.

Unfortunately the value of $\delta$ will vary with current density to the screen electrode 30 which in turn will vary with the degree of focus. It may not, therefore, be practicable to obtain an index ratio as high as 10:1 over the whole screen surface. The effective index ratio can be further increased by arranging the operating conditions to be such that $\delta_1$ is greater than unity while $\delta_2$ is less than unity. Then $1-\delta_1$ will be negative and $1-\delta_2$ will be positive, giving a 180° phase shift in the current to the screen electrode between indexed and non-indexed positions of the beam.

The conditions for oscillation and non-oscillation are then somewhat different. The loop gain should be unity at zero phase shift when the beam is indexed and the amplifier gain should be arranged to fall at 180° phase shift by an amount such that with the loss of gain due to the lower secondary emission the loop circuit will not oscillate.

The loop circuit may be arranged to oscillate at a frequency which is a harmonic of the index frequency, so that the loop frequency will vary if the index frequency varies. This may be of practical advantage in that interference between a harmonic of the index frequency and the carrier frequency will not occur.

I claim:

1. In a color television receiver the combination comprising an indexing type color cathode ray tube having a screen provided with a plurality of indexing members; said cathode ray tube including beam producing means, beam modulating means and beam deflecting means; and a loop circuit having a gain varying between two given conditions comprising said cathode ray tube beam, responsive means for producing a given output during the passage of the cathode ray tube beam over said screen indexing members, and an amplifier coupled between said responsive means and said beam modulating means; said loop circuit gain being adjusted to vary between an oscillatory condition during the given output and a non-oscillatory condition absent the given output of said responsive means.

2. A color television receiver according to claim 1, wherein said deflecting means deflect said beam in a line direction of scanning, wherein said screen is provided with repeating groups of stripes, the stripes of each group fluorescing in different colors under bombardment by said beam and being disposed approximately perpendicular to said line direction, and wherein said responsive means is selectively responsive to one of said colors, the stripes of the said one color constituting the said indexing members.

3. In a color television receiver the combination comprising an indexing type color cathode ray tube having a screen provided with a plurality of indexing members; said cathode ray tube including beam producing means, beam modulating means and beam deflecting means; and a loop circuit having a gain varying between two given conditions comprising said cathode ray tube beam, responsive means for producing a given output during the passage of the cathode ray tube beam over said screen indexing members, and an amplifier coupled between said responsive means and said beam modulating means; said loop circuit being adjusted to vary between greater than unity gain during the given output and a less than unity gain absent the given output of said responsive means.

4. A color television receiver comprising a cathode ray tube, beam producing means, beam deflecting means and beam modulating means in said tube, said tube having a screen provided with a plurality of indexing members of different secondary electron emission coefficient from adjacent parts of said screen, said beam deflecting means scanning said beam over said indexing members and said adjacent parts, an impedance means connected to pass current from said secondary electron emission, a loop circuit having a gain varying between an oscillatory and a non-oscillatory condition in response to passage of said beam over said indexing members and said adjacent parts, said loop circuit comprising said beam, said impedance means, an amplifier connected to said impedance means and generating at the output thereof a voltage dependent upon variations in said secondary emission, and means coupling said output of said amplifier to said beam modulating means.

5. A color television receiver according to claim 4, comprising a source of current for said cathode ray beam, wherein said impedance means is a resistor connected between said indexing members and said source.

6. A color television receiver according to claim 4, wherein the secondary emission coefficient of said indexing member is greater than unity and that of said adjacent parts is less than unity.

References Cited in the file of this patent

UNITED STATES PATENTS

| | | |
|---|---|---|
| 2,759,996 | Bryan | Aug. 21, 1956 |
| 2,771,503 | Schwartz | Nov. 20, 1956 |
| 2,789,156 | Arneson | Apr. 16, 1957 |

UNITED STATES PATENT OFFICE
CERTIFICATE OF CORRECTION

Patent No. 2,960,564 November 15, 1960

John Kenneth Oxenham

It is hereby certified that error appears in the above numbered patent requiring correction and that the said Letters Patent should read as corrected below.

Column 1, line 60, in the equation for "φ" read -- θ --.

Signed and sealed this 12th day of September 1961.

(SEAL)
Attest:

ERNEST W. SWIDER
Attesting Officer

DAVID L. LADD
Commissioner of Patents

USCOMM-DC